United States Patent
Zach, Sr.

(10) Patent No.: US 6,211,818 B1
(45) Date of Patent: Apr. 3, 2001

(54) AUTOMATIC MOVING VEHICLE ALERT

(76) Inventor: Howard L. Zach, Sr., 517 Juneau Ave., Fairbanks, AK (US) 99701

( * ) Notice: Subject to any disclaimer, the term of this patent is extended or adjusted under 35 U.S.C. 154(b) by 0 days.

(21) Appl. No.: 09/345,454

(22) Filed: Jul. 1, 1999

(51) Int. Cl.$^7$ .................................................. B60R 25/10
(52) U.S. Cl. ........................................ 342/357.07; 340/426
(58) Field of Search ..................... 342/357.07, 357.09; 340/426

(56) References Cited

U.S. PATENT DOCUMENTS

| | | | |
|---|---|---|---|
| 5,223,844 | * 6/1993 | Mansell et al. | 342/357.07 |
| 5,334,974 | * 8/1994 | Simms et al. | 340/426 |
| 5,686,910 | 11/1997 | Timm et al. | 340/988 |
| 5,703,598 | 12/1997 | Emmons | 342/357 |
| 5,726,893 | 3/1998 | Schuchman et al. | 364/449.7 |
| 5,805,055 | 9/1998 | Colizza | 340/426 |
| 5,874,889 | * 2/1999 | Higdon et al. | 340/426 |
| 5,919,239 | * 7/1999 | Fraker et al. | 701/213 |
| 5,986,543 | * 11/1999 | Johnson | 340/426 |
| 6,067,007 | * 5/2000 | Gioia | 340/426 |

* cited by examiner

Primary Examiner—Gregory C. Issing
(74) Attorney, Agent, or Firm—Patent & Trademark Services; Thomas Zack; Joseph H. McGlynn

(57) ABSTRACT

A tracking system capable of alerting emergency personnel to the location of a vehicle using the earth circling satellite system referred to as the Global Positioning System (GPS). Using this system an identification code is assigned to a vehicle to be tracked and this information is stored in a central Reporting Center or data station along with a continuous update of the GPS location time and specific identification for that vehicle. An emergency reporting system (VERS) having a vehicle emergency tracker (VET) is employed in each vehicle. Using the VET and the GPS it is possible to pinpoint the location of a specific vehicle that has previously been assigned a specific coded identification. A second substantially identical back up system hidden in the vehicle may be used to send a signal on the location of the vehicle and the time of day at that location and specific identifying data on the vehicle if no responsive signal is received back from the first system indicating the first system has been destroyed or damaged.

1 Claim, 2 Drawing Sheets

AUTOMATIC MOVING VEHICLE ALERT

BACKGROUND OF THE INVENTION

Systems that are used to track the location of a vehicle and provide emergency service at the tracked location are known. With some tracking systems the satellite known as the Global Positioning System (GPS) is used to continuously store the location of the tracked object, like a vehicle. A remote response center can be contacted using a cellular phone and this center can be automatically called again after a predetermined time interval has elapsed. The data automatically transmitted to the remote response center identifies the vehicle and verifies to the center that the system is operative.

Another tracking system uses a continuously powered radio receiver for receiving encoded signals from a remote central station. When the received signal corresponds to a unique code stored in the receiver, a GPS receiver and a radio transmitter located with the stolen property are connected and this position indicating information transmitted to a central station.

Another system using the GPS has a plurality of satellites that transmit time and location data over radio frequency signals. This enables a mobile GPS receiver on the ground to determine its position and allows for the use of a cellular phone to continuously speak to the called party.

Another invention has an anti theft system installed on a motor vehicle includes an electronic control unit connected to a localization information detector and to a telephone apparatus. The control unit can produce a voice message which can be transmitted to police or a security organization. A plurality of sensors are used to detect the theft of the vehicle to initiate this process and to also send a message to a person authorized to use the vehicle by a transmitter-receiver radio and a portable transceiver radio.

In contrast to these described tracking systems and the known prior art, the present invention provides an on board Vehicle Emergency Reporting System (VERS) having a Vehicle Emergency Tracker (VET). This VET has an on-board Global Positioning System (GPS) used to pinpoint the location of the vehicle. Data on the GPS location and an identification code for the specific vehicle are sent to a central Reporting Center (RC) and this data is stored all as further detailed hereafter.

DESCRIPTION OF THE PRIOR ART

Tracking system used with vehicles are known. For example, in the U.S. Pat. No. 5,686,910 to Timm et al. discloses a Global Positioning System (GPS) used to continuously store the location of the tracked object, like a vehicle. A remote response center can be contacted using a cellular phone and this center can be automatically called again after a predetermined time interval has elapsed. The data automatically transmitted to the remote response center identifies the vehicle and verifies to the center that the system is operative.

U.S. Pat. No. 5,703,598 to Emmons uses a continuously powered radio receiver for receiving encoded signals from a remote central station. When the received signal corresponds to a unique code stored in the receiver, a GPS receiver and a radio transmitter located with the stolen property are connected and this position indicating information transmitted to a central station.

U.S. Pat. No. 5,726,893 to Schuchman et al. discloses the use of the GPS with a plurality of satellites that transmit time and location data over radio frequency signals. This enables a mobile GPS receiver on the ground to determine its position and allows for the use of a cellular phone to continuously speak to the called party.

U.S. Pat. No. 5,805,055 to Colizza discloses an anti theft system installed on a motor vehicle which includes an electronic control unit connected to a localization information detector and to a telephone apparatus. The control unit can produce a voice message which can be transmitted to police or a security organization. A plurality of sensors are used to detect the theft of the vehicle to initiate this process and to also send a message to a person authorized to use the vehicle by a transmitter-receiver radio and a portable transceiver radio.

SUMMARY OF THE INVENTION

This invention relates to an on board Vehicle Emergency Reporting System (VERS) having a Vehicle Emergency Tracker (VET). This VET has an on-board Global Positioning System (GPS) used to pinpoint the location of the vehicle. This GPS location, time and an identification code for the specific vehicle are sent to a central Reporting Center (RC). When the vehicle is started and running the location, time and identification data are automatically sent at predetermined time intervals if the user does not correctly enter the code within a second predetermined time interval. If this is done correctly, the unit's sending of data to the center RC is turned off. If not, the location and time for the vehicle and the identification of the vehicle is transmitted to the nearest RC and saved on disk.

It is the primary object of the present invention to provide for an improved on-board tracking system usable with a motor vehicle.

Another object is to provide for such a tracking system that is operable when the vehicle is started and running unless appropriate vehicle identifying data is transmitted to a remote reporting center.

These and other objects and advantages of the present invention will become apparent to readers from a consideration of the ensuing description and the accompanying drawings.

DESCRIPTION OF THE PREFERRED EMBODIMENT

Figure 1:
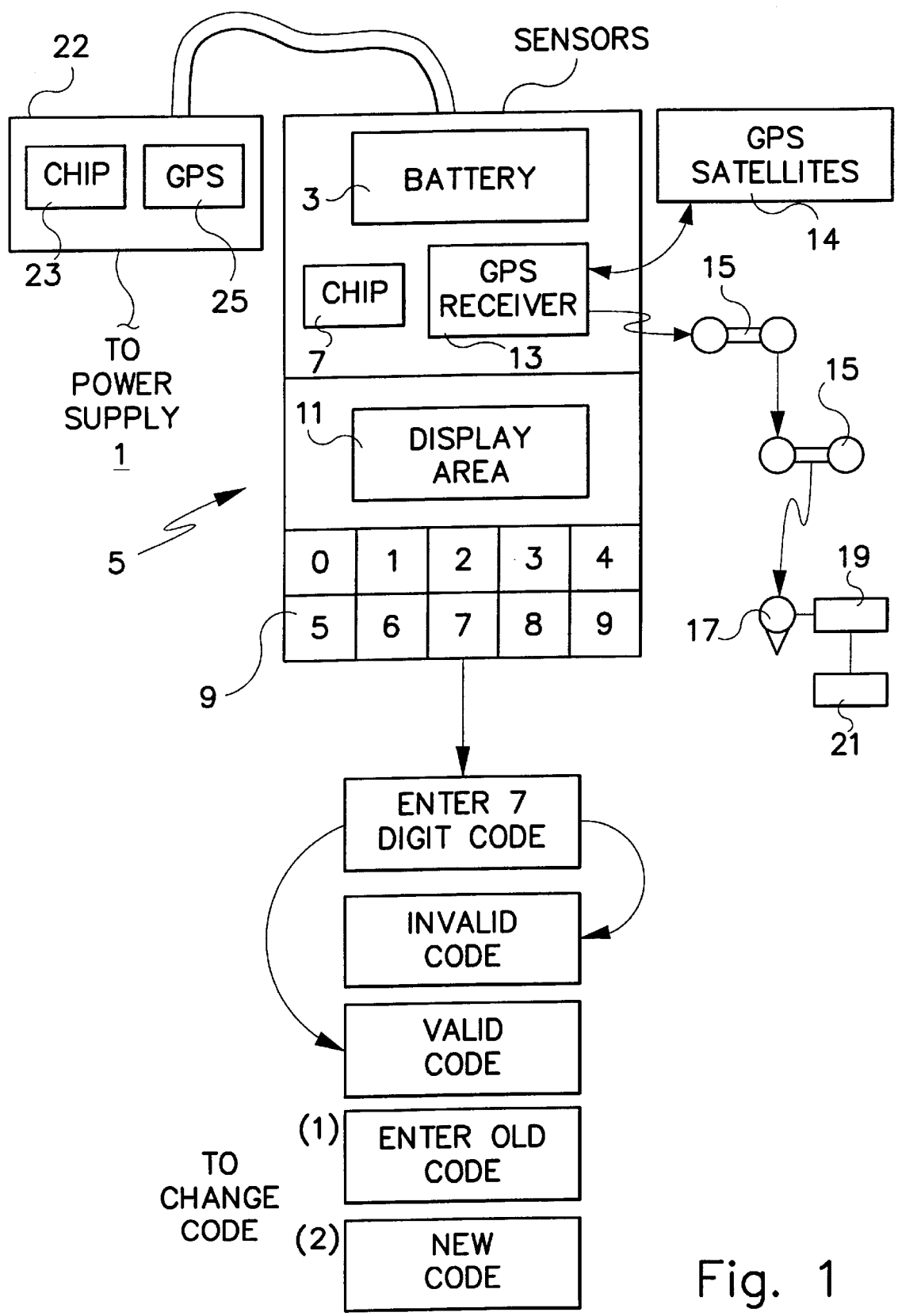
FIG. 1 is a schematic view of the arrangement of interrelated components of the present invention.

FIG. 1 is a schematic view of arrangement of interrelated components of the present invention. All of the specific individual sub components are conventional known components unless otherwise stated. The Automatic Moving Vehicle Alert (AMVA) of this invention is electrically operated by the existing external power supply source such as a battery commonly found in existing vehicles (e.g., a twelve volt battery 1). A second battery backup unit 3 is located within the confines of the main AMVA unit housing 5 to insure a power source for the AMVA. A conventional computer chip 7 is used to store the seven digit identification code for the specific vehicle which has been assigned and placed in the chip. Initially, the owner or authorized user of the vehicle uses the keyboard 9 to manually enter signals into the chip 7. The number for each pressed button 0–9, inclusive, in keyboard 9 is visually displayed on the display area or screen 11 by the security notation *s for each digit as a key is pressed. To activate the AMVA system one needs to press the correct identification code in keyboard 9 every time the vehicle is started and operated. Operating instructions for the system are also displayed on screen Page 6 11 for a predetermined time internal (e.g., 30 seconds) to instruct a user in the operation. In order, these displayed instructions read:

1. Enter 7 Digit Code
2. Invalid Code, if the incorrect code is entered or
3. Valid code if the correct 7 digit code is entered.

Should the user wish to change the existing "old" code stored in chip 7, he or she must first simultaneously depress any two different keys on the keyboard 9 and then correctly enter the old code. Thereafter, the new code is immediately entered and stored for future use in computer chip 7.

A user of the data entry keyboard 11 will have a predetermined time interval, like 30 seconds, to correctly enter the 7 digit code. If a mistake is made by the user in this entry process, the AMVA will repeatedly request the user by visual instructions on screen 11 to enter the seven digit code and do so for a second predetermined time period. After this second time interval, if no proper authorization matching code is entered, the GPS determined location and time will be transmitted via a very high frequency (VHF) signal on a frequency within a bandwidth of 137–150 MHz frequency to a communication satellite system 15 (satcom). This transmitted signal to the communication satellite system 15 results in the sending of a 400 MHz transmission signal down from this satellite to the fixed data communication device at a data base station 17 on location. This transmission to devices in station 17 repeats itself automatically after a third predetermined time interval, like 5 minutes, has elapsed.

Once the correct code has been entered into the system, the conventional Global Positioning System (GPS) receiver 13 is activated. This GPS receives signals from a remote GPS satellite system 14 orbiting the earth and allows information to be obtained from the GPS system to indicate, within a very small area, the exact location from which the initial signal is sent (i.e., the location on earth and time the vehicle including a car,truck,motorcycle, boats, etc. having the receiver unit 13 mounted in it). Normally, three spaced orbiting satellites are used in the GPS satellite system 14 employing triangulation techniques to determine this exact ground location on earth.

Should the proper information be entered for the identification code, the AMVA unit will remain in a dormant state if the vehicle does not move. If the vehicle does not move for a set period of time, such as 5 minutes, the AMVA will visually (on screen 11) request the entering of the seven digit authorization code by the user when the vehicle is placed in gear and does move at a later time.

After the vehicle stops moving for a predetermined time interval, like 5 minutes, and with the engine running, the AMVA is activated to visually request (via screen 11) that the authorization code be entered via keyboard 9. This feature allows for the detection of the unauthorized use of a vehicle during an engine idling period when the authorized user is out of the vehicle, such as when buying groceries or running other errands. This particular added feature is used to compensate for the period of time an engine in a parked car is kept running and find particular applicability in very cold weather climates.

The AMVA unit continues to transmit data signals to the Reporting Center (RC) as long as its engine is running until the engine is shut off, at this time the last location and time will be stored in the first computer chip 7 and the second computer chip 23. Normally, the transmitted pulses to the communication satellite 15 and the return pulses to the data base station 17 would occur at fixed time intervals, such as 5 minutes. This transmitted information is in the form of data pulses and informs the vehicle data base station 17, normally remote from the location of the vehicle, of the vehicle's location and the date and time the vehicle was at that particular location.

Operatively associated with the data base station 17 is a conventional computer data storage medium 19 such as a computer storage disk. The medium 19 stores the received data indicating the identification and location of a specific vehicle and the date and time of day the vehicle was at that location. Conventional computer hardware 21 operatively associated with data storage medium 19 is capable of telephoning or otherwise communicating with any interest agency, like an insurance company or the police, to inform them of the unauthorized running or movement of a specific vehicle, the location of the vehicle and when the same took place. Prior agreement on specific instructions between the owner of the vehicle and the data receiving unit 19 would determine the appropriate action to then take.

Figure 2:
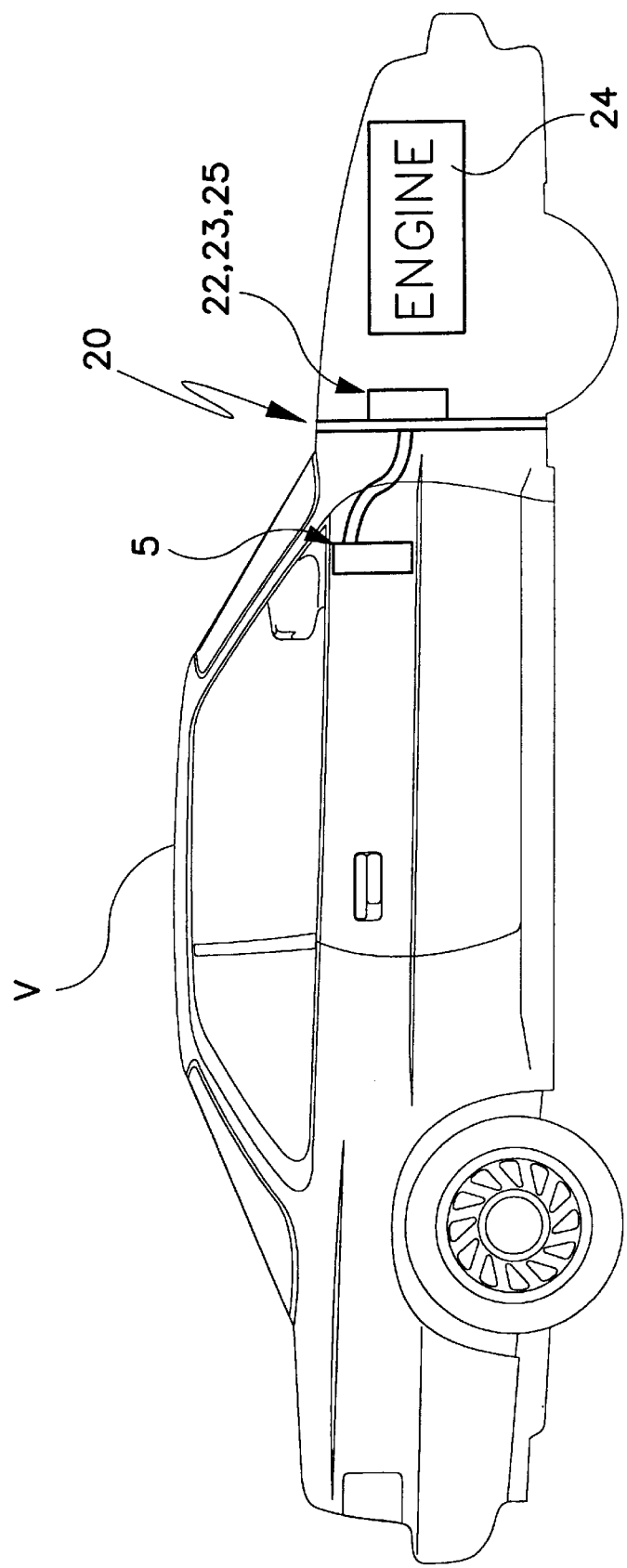
FIG. 2 is a schematic view illustrating the mounting of units within a vehicle.

FIG. 2 is a schematic view illustrating the mounting of units within a vehicle V. Operatively connected to the power input 1, and interposed between the main AMVA unit in housing 5, is a second smaller housing 22 with the conventional computer chip unit and a second conventional GPS receiver unit. At shown in figure, the second housing 22 may be placed forward of the fire wall 20 to the rear of the vehicle's engine 24. The smaller second unit 22 constantly sends a detection signal to the main AMVA unit 5 on the other side of the fire wall and its computer chip 7 and GPS unit 13. If a response detection signal is not received back by the computer chip 23 and GPS unit 25, the second unit 22 would transmit the location and time of the vehicle and its identification code to the remote data base station 17 (see FIG. 1). This back up feature would allow the operation of the automatic vehicle movement alert when the main AMVA in housing 5 was removed or destroyed. To protect it from removal or destruction, the second housing 22 with its internal computer chip 23 and GPS unit 25 would be mounted in a hidden location on the vehicle that could not easily be found or removed, or both.

It should be clear that the described embodiment does not require the owner or authorized user of a vehicle to know and initiate the method of tracking. The AMVA automatically and immediately detects the location and time a specific identified vehicle is started and moved without consent. Also, conceptually the principles set forth in the operation of this invention could be modified for use with other movable objects or even individuals as long as the necessary operative elements are present to contact a global positioning satellite system and to transmit signals to a remote station location on earth to provide storage intelligence data on the location and time of the object or person.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A vehicle tracking system to track the location on earth of a vehicle comprising:

a global positioning satellite system operatively orbiting the earth and usable to determine the location of a vehicle on the earth, said global positioning satellite system being capable of determining the location on earth of a vehicle and the time at that location;

a vehicle having an engine to propel said vehicle:

a first housing mounted on said vehicle, said first housing having a first computer chip connected to a first global positioning unit;

said first global positioning unit within said first housing operatively connected to said first computer chip and activated by a signal from said vehicle's engine when the engine of said vehicle is operative;

said first global positioning unit being capable in an operative state to receive signals from said global positioning satellite system and to transmit signals to a satellite communication system when the vehicle's engine is operative to determine the position of the vehicle on earth at a given time;

a data entry keyboard and a visual display operatively associated with said first computer chip, said first computer chip having specific identifying coded data associated with said chip that can be entered into said first computer chip from said data entry keyboard, said entered data when matched with the specific identifying coded data on said first computer chip indicating an authorized user is operating the vehicle;

a data base station remote from said first global positioning unit and responsive to receive and store data signals transmitted from the first global positioning unit to indicate the location on earth of the vehicle as determined by the global positioning satellite system and the time of day the vehicle is at that location;

a computer operatively associated with said data base station to receive data transmitted from said data base station, said data indicating the location of the vehicle and the time at that location, whereby said data base station can communicate with an outside entity regarding said received data;

a second housing mounted to said vehicle, said second housing having a second computer chip connected to a second global positioning unit that is operatively associated with said second computer chip;

said operative second computer chip and said second global positioning unit being operatively associated with said global positioning satellite system to process data indicating their location on earth at a given time;

said second computer chip and said second global positioning unit sending a signal to the first computer chip and said second global positioning unit requesting a return signal; and said second computer chip and said second global positioning unit transmitting a signal to said data base station if no return signal is received from said first computer chip and first global positioning unit, said data base transmitted signal indicating the location of the vehicle and the time of day at that location.

* * * * *